United States Patent
Lee et al.

(10) Patent No.: US 7,648,128 B2
(45) Date of Patent: Jan. 19, 2010

(54) GAS-LIQUID CONTACT APPARATUS

(75) Inventors: Adam T. Lee, Dallas, TX (US); Kuang-Yeu Wu, Plano, TX (US); Larry W. Burton, Waxahachie, TX (US)

(73) Assignee: AMT International, Inc., Richardson, TX (US)

( * ) Notice: Subject to any disclaimer, the term of this patent is extended or adjusted under 35 U.S.C. 154(b) by 592 days.

(21) Appl. No.: 11/644,164

(22) Filed: Dec. 22, 2006

(65) Prior Publication Data

US 2008/0150171 A1  Jun. 26, 2008

(51) Int. Cl.
*B01F 3/04* (2006.01)
(52) U.S. Cl. ............... 261/114.1; 261/114.4; 261/114.5
(58) Field of Classification Search ............... 261/114.1, 261/114.2, 114.3, 114.4, 114.5
See application file for complete search history.

(56) References Cited

U.S. PATENT DOCUMENTS

| | | | |
|---|---|---|---|
| 3,218,048 A | 11/1965 | Smith, Jr., et al. | |
| 3,450,393 A | 6/1969 | Munters | |
| 3,647,192 A | 3/1972 | DeGroot et al. | |
| 3,729,179 A | 4/1973 | Keller | |
| 3,747,905 A | 7/1973 | Nutter | |
| 3,887,665 A | 6/1975 | Mix et al. | |
| 3,959,419 A | 5/1976 | Kitterman | |
| 4,105,723 A | 8/1978 | Mix | |
| 4,132,761 A | 1/1979 | Mix | |
| 4,274,923 A | 6/1981 | Mahar | |
| 4,300,918 A | 11/1981 | Cary | |
| 4,528,068 A | 7/1985 | Fiocco et al. | |
| 4,597,916 A | 7/1986 | Chen | |
| 4,603,022 A | 7/1986 | Yoneda et al. | |

(Continued)

FOREIGN PATENT DOCUMENTS

EP  0 250 020 A2  12/1987

(Continued)

OTHER PUBLICATIONS

Chen, Gilbert K., "Packed Column Internals", *Chemical Engineering*, Mar. 5, 1984, © 1984 by McGraw-Hill Inc., pp. 40-51.

(Continued)

*Primary Examiner*—Scott Bushey
(74) *Attorney, Agent, or Firm*—Davis & Bujold, P.L.L.C.

(57) ABSTRACT

An apparatus is provided for improved gas/liquid contact in a chemical process tower, resulting in better performance. The apparatus includes a tower having a series of tray decks and downcomers. Tray decks provide gas/liquid contact for mass transfer and the downcomers are required to clarify the liquid before entering the tray below. In this invention, the trays have at least one downcomer and one adjacent active sump. The sump has at least one row of apertures for bubbling vapor through liquid flowing therein, and is separated from the downcomer by a baffle. The clarified liquid at the bottom of the sump is sent to the downcomer. The liquid entering the next tray can be assured to divide evenly for multiple-downcomer applications. Gas/liquid contact is thereby enhanced through the installation of these apertures, and clarification of the liquid from bubbles is thereby improved through the addition of the active sump. Benefits to the tower operation include higher tray capacity and efficiency.

7 Claims, 2 Drawing Sheets

U.S. PATENT DOCUMENTS

| | | |
|---|---|---|
| 4,604,247 A | 8/1986 | Chen et al. |
| 4,818,346 A | 4/1989 | Bentham et al. |
| 4,842,778 A | 6/1989 | Chen et al. |
| 4,950,430 A | 8/1990 | Chen et al. |
| 4,954,294 A | 9/1990 | Bannon |
| 5,139,544 A | 8/1992 | Lucero et al. |
| 5,192,466 A | 3/1993 | Binkley |
| 5,213,719 A | 5/1993 | Chuang |
| 5,244,604 A | 9/1993 | Miller et al. |
| 5,262,094 A | 11/1993 | Chuang |
| 5,269,976 A | 12/1993 | Biddulph et al. |
| 5,277,847 A | 1/1994 | Gentry et al. |
| 5,366,666 A | 11/1994 | Chuang et al. |
| 5,389,343 A | 2/1995 | Gentry |
| 5,439,510 A | 8/1995 | Lerner |
| 5,453,222 A | 9/1995 | Lee et al. |
| 5,454,989 A | 10/1995 | Nutter |
| 5,554,329 A | 9/1996 | Monkelbaan et al. |
| 5,707,563 A | 1/1998 | Monkelbaan et al. |
| 5,762,668 A | 6/1998 | Lee et al. |
| 5,837,105 A | 11/1998 | Stober et al. |
| 5,972,171 A | 10/1999 | Ross et al. |
| 5,975,504 A | 11/1999 | Nutter et al. |
| 6,053,484 A | 4/2000 | Fan et al. |
| 6,059,934 A | 5/2000 | Stober et al. |
| 6,076,813 A | 6/2000 | Yeoman et al. |
| 6,287,367 B1 | 9/2001 | Buchanan et al. |
| 6,371,455 B1 | 4/2002 | Lee et al. |
| 6,588,735 B2 | 7/2003 | Bosmans et al. |
| 6,817,596 B2 | 11/2004 | Fischer |
| 2003/0183957 A1 * | 10/2003 | Zarabi .................... 261/114.4 |

FOREIGN PATENT DOCUMENTS

| | | |
|---|---|---|
| GB | 1065554 | 4/1967 |

OTHER PUBLICATIONS

Wankat, Phillip C., "4.2 Distillation Equipment", *Equilibrium Staged Separations*, PTR Prentice Hall, © 1988, pp. 94-96.

Lockettt, M. J., "Distillation tray fundamentals", Cambridge University Press, Cambridge, England, c. 1986, pp. 178-186.

Wankat, Phillip C., "Equilibrium staged separations", Elsevier, New York, USA, c. 1988, pp. 372-379.

Kister, Henry Z., "Distillation Design", McGraw-Hill, Inc., 1992, pp. 382-389.

Wijn, E. F., "The effect of downcomer layout pattern on tray efficiency", published in *The Chemical Engineering Journal*, Jan. 30, 1996, vol. 63, pp. 167-180.

Stichlmair, Johann G. et al., "Distillation: Principles and Practices", Wiley-VCH, New York, USA, c. 1998, pp. 386-389.

UOP, Brochure entitled "Trays for Distillation, Absorption, Stripping and Extraction", 2008.

King, C. Judson, "Separation Process", McGraw Hill Book Company, 1980, 2d edition, pp. 614, 619.

Kister, Henry C., "Distillation Design", McGraw-Hill Inc., 1992, p. 383.

* cited by examiner

GAS-LIQUID CONTACT APPARATUS

FIELD

The present invention relates to chemical process towers and, more particularly, but not by way of limitation, to improved gas/liquid contact therein.

BACKGROUND

It is a continuing goal to improve the efficiency of processes that are conducted using chemical process towers. To this end, many different approaches have been undertaken.

Gas/liquid contact is performed using cross-flow trays situated within the tower. Tray design typically includes a deck across which liquid flows, and a downcomer to convey liquid from one tray to that immediately below. The deck is perforated with apertures so that gas rises through said deck and then bubbles through the liquid. Gas ascends through the apertures and contacts the liquid moving across the tray through the "active" area thereof. It is in this area that liquid and gas mix and fractionation occurs during separation by distillation. The liquid is directed onto the tray by means of an inlet downcomer from the tray above. The liquid moves across the tray and exits through another downcomer. It is the active area of the tray which most directly effects gas liquid contact and thus mass transfer efficiency.

During normal operation, little if any liquid descends through the perforations. The rate of liquid flow in the downcomers and the geometry of the tray are designed so that a liquid seal is achieved at the bottom of the downcomers and so little if any gas rises in the downcomers from the tray below.

Optionally, the apertures perforating the deck may have bubble caps or valves that allow the flow of gas and provide better gas/liquid contact.

There may be one, two, or more downcomers from a tray. When there are more than one downcomers from a tray, the liquid flow is divided toward each of the downcomers and so the distance a liquid flows across the deck toward a downcomer is reduced.

Towers are designed so that there is disengagement of gas from the liquid in the top area of the downcomer, so that bubbles do not get conveyed as froth to the tray below. A weir is used to control the weir crest, so as to regulate the depth of froth above the top of the weir. The liquid head within a downcomer depends to a large extent on the pressure difference between successive decks and to a lesser extent also on factors including friction losses. These and other design features of towers are described by, for example, Philip C. Wankat in "Equilibrium Staged Separations" published by Elsevier (1988).

Separation processes that can be performed in chemical process towers include distillation and absorption. The optimum design of a tower having trays ensures maximum throughput (i.e. capacity) and mass transfer efficiency. At high throughput there is a tendency for liquid to be entrained at high gas velocity. This reduces the capacity as well as efficiency of the tower, caused by the liquid blowing to the tray above. Similarly, there can be entrainment of bubbles in down-flowing liquid when the downcomer design does not allow effective disengagement of gas. This can result in downcomer backup and reduce tray capacity.

The maximum throughput is reduced if the downcomer capacity is reached before high entrainment occurs on the tray. It is an objective of the present invention to effectively improve the downcomer capacity.

Bannon in U.S. Pat. No. 4,954,294 issued in 1990 described an apparatus for sealing vapor/liquid contacting trays on start-up of a downcomer-equipped vapor/liquid contactor. The downcomer is divided into two portions so that, at start-up, liquid immediately flows down one portion to an area of the tray below where a weir retains that liquid so as to form a seal. When the tray is in normal operation the liquid mainly flows down the other portion of the downcomer. A limitation of this apparatus is that the active mixing area of the tray is essentially only the area above the deck, and the area occupied by the first portion of the downcomer is not within that active mixing area.

Chuang in U.S. Pat. No. 5,213,719 issued in 1993 described a gas-liquid contacting device for increased gas-liquid flow rate capacity. The apparatus has, in addition to the conventional downstream downcomer, an upstream downcomer to handle up to 15% of the liquid flow. The upstream downcomer has a perforated plate sealing the lower end at a height above the froth of the tray below. Again, the area occupied by the upstream downcomer is not within the active mixing area of the tray.

The apparatus of the present invention has superior performance when compared to all prior art devices. We will now describe two embodiments of the present invention being apparatus which has higher capacity for handling high liquid flow rates when compared with the prior art.

SUMMARY

There is provided an apparatus for improved downcomer capacity in a gas/liquid contactor, and for increased tray efficiency. In particular, a baffle is situated so as to divide a downcomer adjacent to the walls of the apparatus, to form both a downcomer similar to a conventional downcomer design described in the book "Equilibrium Staged Separations" by Wankat (1988), and an active sump between the upper portion of that downcomer and the edge of the deck of a tray. Apertures in the active sump have similar function to those in the active tray and thus enhance the mass transfer efficiency. The area below the apertures feeding gas into the sump is a calming zone that facilitates gas/liquid separation. As a result, the liquid is substantially clarified before it is fed from the active sump into the lower part of the downcomer, from which it exits from the downcomer to the tray below.

DESCRIPTION OF THE DRAWINGS

For a more complete understanding of the present invention and for further objects and advantages thereof, reference is made to the following description taken in conjunction with the accompanying drawings.

DETAILED DESCRIPTION

Exemplary embodiments, which are non-limiting, will now be described with reference to FIG. 1 and FIG. 2.

Several designs are known for gas/liquid contactors, as described by, for example, Philip C. Wankat in "Equilibrium Staged Separations" published by Elsevier (1988). The present invention incorporates many basic components common to such contactors, which are incorporated by reference, and new features that distinguish the invention from the prior art. Two embodiments of the present invention now will be described with reference to FIG. 1 and FIG. 2 respectively.

Figure 1:
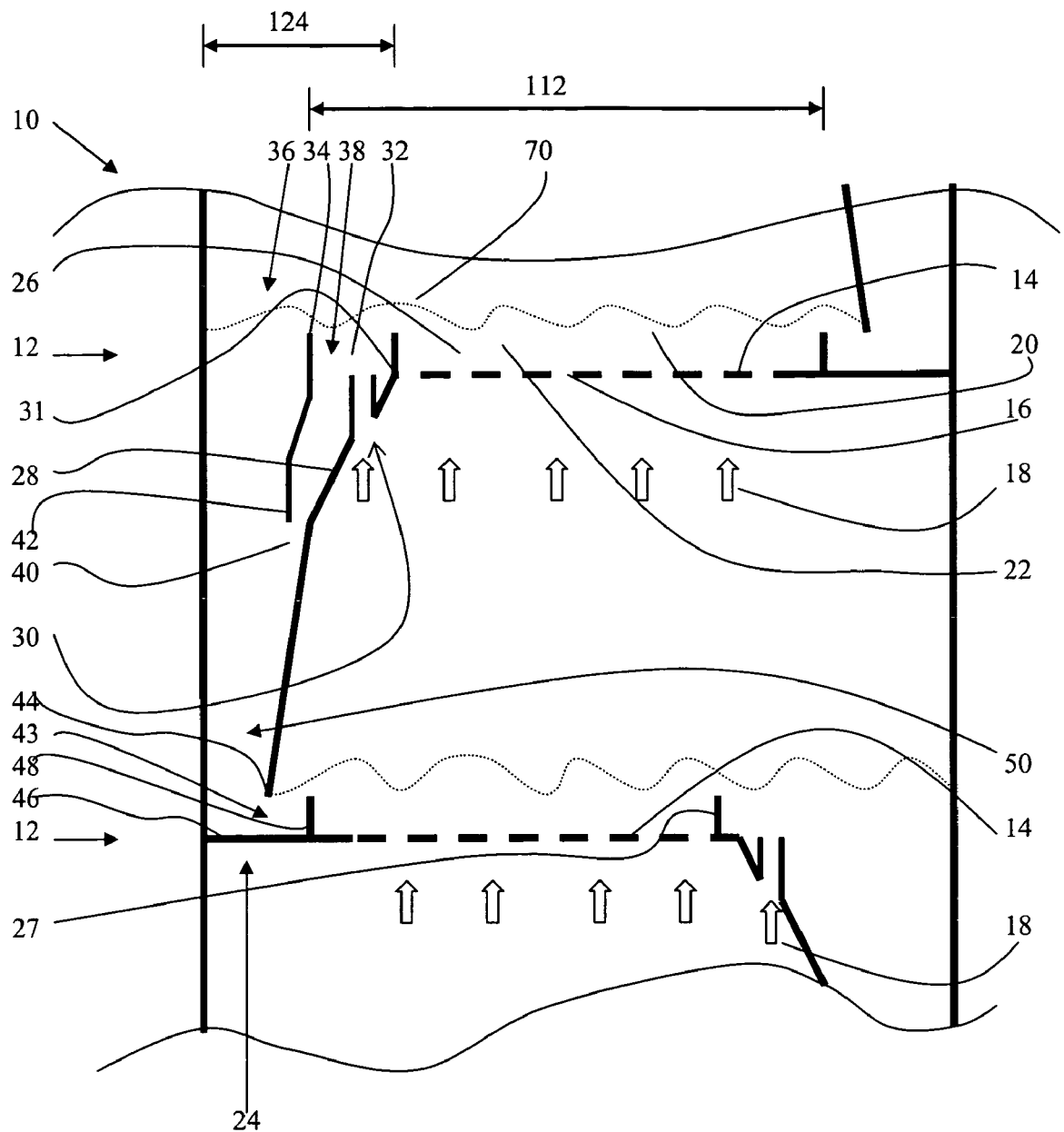
FIG. 1 is a partial vertical cross-sectional view of a first embodiment of the gas/liquid contactor according to the present invention.

FIG. 1 shows a partial cross-sectional view of a first embodiment of a tower that is a gas/liquid contactor 10. Tower 10 is fitted with a plurality of trays 12. Each tray 12 has a deck 14 that is perforated with apertures 16. Gas, shown as arrows 18, passes through apertures 16 and rises through liquid 20 that is flowing across deck 14, forming bubbles 22 in the active mixing area the extent of which is shown by arrow 112. Liquid 20 flows across deck 14 toward at least one downcomer 24. Optionally, a first weir 27 can be situated so as to control the weir crest 70 and to maintain a depth of froth and liquid 20 above deck 14, provided that said depth of froth and liquid 20 is not detrimental to flow of gas 18 through apertures 16. Optionally, an inlet weir 48 can be situated so that a liquid seal is achieved below downcomer 24, thus preventing gas 18 from entering a lower portion 50 of downcomer 24. Preferably, apertures 16 have valves 26 through which gas 18 ascends to contact liquid 20 flowing across deck 14.

A plate 28 descends from an edge 31 of deck 14. In FIG. 1 plate 28 is shown as descending in two stages at an increasing angle to the plane of deck 14. From the following description of the role of plate 28, it will be recognized that said plate 28 may have a variety of shapes, and may be in one or several sections, and may be straight or curved. Plate 28 has several tubular passages 30 by which gas can pass through said plate 28. Preferably, each of passages 30 has another valve 32 at the same height as valves 26 above deck 14. There is a space 43 between the bottom edge 44 of plate 28 and the top face 46 of deck 14 immediately below plate 28.

An upper substantially vertical portion 36 of downcomer 24 is separated by a baffle 34 from an active sump 38. Gas 18 rising through passages 30 and valves 32 is bubbled through liquid 20 in the top area of active sump 38. In a preferred embodiment, the bottom edge 42 of baffle 34 is connected to plate 28 at a position situated above bottom edge 44 of plate 28, and a series of apertures 40 situated toward bottom edge 44 allow liquid 20 to pass through baffle 34 toward lower portion 50 of downcomer 24. Alternatively, there is a space between bottom edge 42 of baffle 34 and proximate part of plate 28.

The effect of bubbling gas 18 through liquid 20 in active sump 38 is to enhance gas/liquid contact and the extent of active mixing area 112.

One effect of dividing the downflow of liquid 20 between upper portion 36 of downcomer 24 and active sump 38 is more effective removal of bubbles 22 within said liquid 20 so that liquid 20 in lower portion 50 of downcomer 24 is clarified to clearer liquid, and so there is less frothing. A second effect is that, while the active area for mixing extends beyond the area immediately above deck 14, as shown by arrow 112, the effective downcomer top area 124 extends above both downcomer 24 and active sump 38. Consequently, apparatus 10 performs as though its effective cross-sectional area is larger than that of prior art apparatus.

First portion 36 of downcomer 24 and active sump 38 are immediately adjacent each other. The liquid flowpath extends from the inlet to the outlet downcomer. In this way the flowpath for contacting of gas 18 and liquid 20 due to the installation of the active sump does not change significantly so the tray efficiency of each of trays 12 is maximized.

Figure 2:
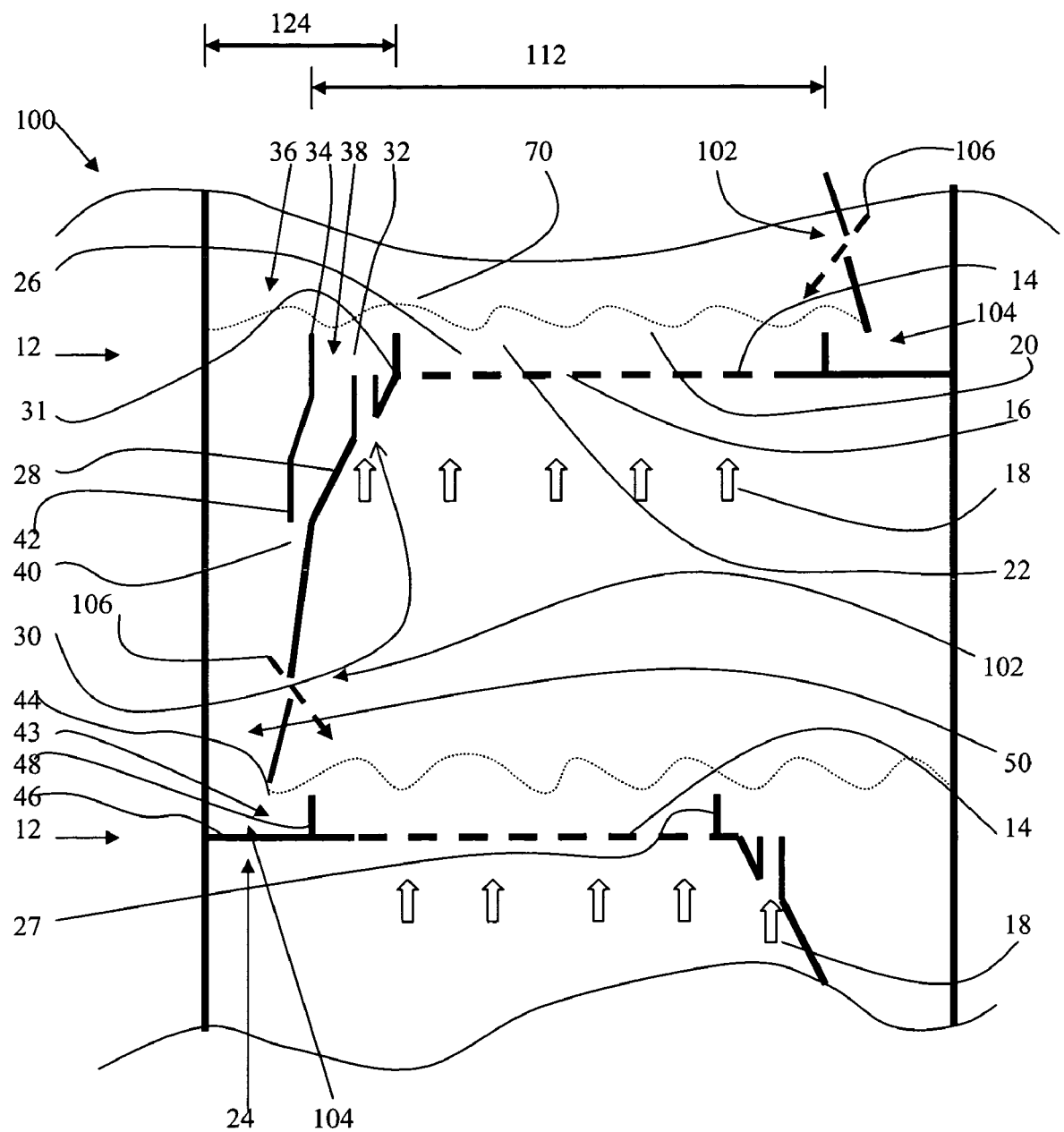
FIG. 2 is a partial vertical cross-sectional view of a second embodiment of the gas/liquid contactor according to the present invention.

A second embodiment of a tower that is a gas/liquid contact 100 is illustrated in FIG. 2. Second embodiment 100 is substantially similar to first embodiment 10, with one modification. A series of apertures 102 are situated toward bottom edge 44 of plate 28. Apertures 102 allow liquid 20 to bypass the area 104 immediately below downcomer 24, as shown by arrow 106. Thus, when there is a build up of solids in area 104, such as can happen when inlet weir 48 is installed on deck 14 so as to form a liquid seal below downcomer 24, liquid 20 does not agitate and carry said solids as it flows across deck 14.

Thus in either first embodiment 10, shown in FIG. 1, or second embodiment 100, shown in FIG. 2, active mixing area 112 extends beyond the area above deck 14, in contrast to the prior art. At the same time, the effective downcomer top area 124 includes both the area of downcomer 24 and that of active sump 38.

The advantages accruing from use of the present invention are several when compared with prior art gas/liquid contactors, including:

Bubbling of gas 18 through liquid 20 within active sump 38 effectively increases the gas/liquid contact area of each tray to include both the area above deck 14 and the area at the top of active sump 38.

The combination of downcomer 24 and active sump 38 effectively decreases weir loading and increases effective downcomer area without loss of active mixing area.

The present invention provides for design of trays having better balance in multi-pass tray applications.

In combination, these advantages enable first embodiment 10 and second embodiment 100 to perform as though their effective cross-sectional area is larger than that of prior art apparatus. Thus these advantages combine to provide higher capacity for handling high liquid flow rates when compared with towers of similar size and external geometry having prior art gas/liquid contactors. Also:

Liquid 20 exiting active sump 38 and entering lower portion 50 of downcomer 24 creates turbulence in downcomer 24, thus preventing settling of any particulate solids that may be entrained, which is an additional advantage for fouling applications.

We claim:

1. An apparatus for gas/liquid contact in a chemical process tower, comprising a tower and a series of trays and downcomers, in which:

each tray has a deck that is perforated with apertures through which gas can rise through liquid that is flowing across said deck, forming bubbles;

at least one plate descends from an edge of the deck toward a tray immediately below so as to form a downcomer volume situated between the edge of the deck and walls of the tower, the plate having several substantially vertical tubular passages by which gas can pass through said plate, a top of each of said passages being at about the same height as a surface of the deck;

a baffle is situated between the edge of the deck and the walls of the tower so as to divide the downcomer volume into two substantially vertical portions, a first portion being a downcomer immediately adjacent to the walls of the tower and a second portion being an active sump situated between the first portion and the edge of the deck, there being apertures toward the bottom edge of the baffle through which liquid can descend from the active sump to a lower portion of the downcomer volume, such that gas rising through the passages in the plate is bubbled through liquid flowing into the active sump.

2. An apparatus according to claim 1, wherein each of the apertures in the deck is fitted with a valve through which gas can rise, and each of the passages through the plate has a valve at the top that is at about the same height as the valves fitted to the apertures in the deck.

3. An apparatus according to claim 1, wherein there is a weir that is situated upon and toward the edge of the deck so as to control a weir crest and maintain a depth of froth and liquid flowing over the deck.

4. An apparatus according to claim 1, wherein there is an inlet weir that is situated upon the deck so as to form a liquid seal immediately below the downcomer volume from a tray above.

5. An apparatus for gas/liquid contact in a chemical process tower, comprising a tower and a series of tray and downcomers, in which:
- each tray has a deck that is perforated with apertures through which gas can rise through liquid that is flowing across said deck, forming bubbles;
- at least one plate descends from an edge of the deck toward a tray immediately below so as to form a downcomer volume situated between the edge of the deck and walls of the tower, the plate having several substantially vertical tubular passages by which gas can pass through said plate, a top of each of said passages being at about the same height as a surface of the deck;
- a baffle is situated between the edge of the deck and the walls of the tower so as to divide the downcomer volume into two substantially vertical portions, a first portion being a downcomer immediately adjacent to the walls of the tower and a second portion being an active sump situated between the first portion and the edge of the deck, there being a space between a bottom edge of the baffle and a nearest part of the plate descending from the deck, through which liquid can descend from the active sump to a lower portion of the downcomer volume, such that gas rising through the passages in the plate is bubbled through liquid flowing into the active sump;
- an inlet weir is situated upon the deck so as to form a liquid seal immediately below the downcomer; and
- a series of apertures are situated toward a bottom edge of the plate, the apertures allowing liquid to bypass an area immediately below the downcomer volume.

6. An apparatus according to claim 5, wherein each of the apertures in the deck is fitted with a valve through which gas can rise,
and each of the passages through the plate has a valve at the top that is at about the same height as the valves fitted to the apertures in the deck.

7. An apparatus according to claim 5, wherein there is a weir situated upon and toward the edge of the deck so as to control a weir crest and to maintain a depth of froth and liquid flowing over the deck.

* * * * *